(12) United States Patent
Ishida

(10) Patent No.: US 6,617,716 B2
(45) Date of Patent: Sep. 9, 2003

(54) ROTARY ELECTRIC MACHINE HAVING STATOR COOLANT PASSAGE MEANS

(75) Inventor: Hiroshi Ishida, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/000,310

(22) Filed: Dec. 4, 2001

(65) Prior Publication Data

US 2002/0074868 A1 Jun. 20, 2002

(30) Foreign Application Priority Data

Dec. 14, 2000 (JP) ........................................ 2000-380635

(51) Int. Cl.[7] .............................. H02K 9/00; H02K 9/19
(52) U.S. Cl. ...................... 310/58; 310/60 A; 310/89; 310/54; 310/59; 310/64
(58) Field of Search ................................ 310/60 A, 54, 310/59, 64, 58, 89

(56) References Cited

U.S. PATENT DOCUMENTS

| | | | | |
|---|---|---|---|---|
| 4,739,204 A | * | 4/1988 | Kitamura et al. | 310/68 D |
| 4,818,906 A | * | 4/1989 | Kitamura et al. | 310/58 |
| 4,922,148 A | * | 5/1990 | Kitamura | 310/68 D |
| 5,655,485 A | * | 8/1997 | Kusase et al. | 123/41.31 |
| 6,087,746 A | * | 7/2000 | Couvert et al. | 310/60 R |
| 6,160,332 A | * | 12/2000 | Tsuruhara | 310/54 |
| 6,169,344 B1 | * | 1/2001 | Tsuruhara | 310/58 |
| 6,218,747 B1 | * | 4/2001 | Tsuruhara | |

FOREIGN PATENT DOCUMENTS

| | | | | |
|---|---|---|---|---|
| EP | 000633647 A1 | * | 1/1995 | |
| JP | 59-209053 A | | 11/1984 | |
| JP | 62178139 A | * | 8/1987 | H02K/9/19 |
| JP | 62189939 A | * | 8/1987 | H02K/9/19 |
| JP | 62217838 A | * | 9/1987 | H02K/9/19 |
| JP | 04004736 | * | 1/1992 | H02K/9/19 |
| JP | 06070507 A | * | 3/1994 | H02K/9/19 |

OTHER PUBLICATIONS

U.S. patent application Ser. No. 09/740,038, Yoshida et al., filed Dec. 20, 2000.

* cited by examiner

Primary Examiner—Thomas M. Dougherty
Assistant Examiner—Heba Y. M. Elkassabgi
(74) Attorney, Agent, or Firm—Oliff & Berridge, PLC

(57) ABSTRACT

In a rotary electric machine, a stator coolant passage means including a stator coolant tube and a damping member is provided between the inner periphery of a front housing and a stator core to surround the stator core. Since the stator core is cooled by coolant flowing in the stator coolant tube, heat transmission from the stator core to the damping member is decreased. Thus, the damping member is restricted from deteriorating due to high temperature. Further, an additional coolant tube is provided separately from the stator coolant passage means to cool heat-generating bodies such as a commutating device and a voltage generator. The coolant flows in the stator coolant tube prior to the additional coolant tube so that the coolant flowing in the stator coolant tube is not thermally affected by the coolant flowing in the additional coolant tube.

13 Claims, 3 Drawing Sheets

ROTARY ELECTRIC MACHINE HAVING STATOR COOLANT PASSAGE MEANS

CROSS REFERENCE TO RELATED APPLICATION

The present application relates to and incorporates herein by reference Japanese Patent Application No. 2000-380635 filed on Dec. 14, 2000.

BACKGROUND OF THE INVENTION

The present invention relates to a rotary electric machine mounted within a passenger car, truck or other vehicles, in which heat-generating bodies are cooled by circulation of cooling medium.

In JP-A-59-209053, it is proposed to provide, in a rotary electric machine, a flexible damping member between a stator core and a housing to restrict resonance noise due to vibration of the stator core. However, because the damping member is disposed proximate to the stator core, the damping member is heated due to an excessive current loss of the stator core or the like. As a result, the damping member is deteriorated. Further, the stator core is likely to be moved by magnetic force of the rotor due to decrease in holding power of the stator core.

In JP-B2-5-16261 (U.S. Pat. No. 4,818,906), in a rotary electric machine, a coolant passage for flowing engine coolant is formed in a housing to cool electric components such as an armature coil and a commutating device. However, when the coolant passage is formed in the housing, the housing is necessarily decreased in thickness to maintain a size of an external form or an axial length of the rotary electric machine. Accordingly, rigidity of the housing is lessened, and as a result, magnetic noise is likely to increase.

SUMMARY OF THE INVENTION

The present invention is made in view of the above problems, and it is an object of the present invention to provide a rotary electric machine mounted on a vehicle, in which a temperature rise of a damping member is suppressed and magnetic noise is decreased.

According to the present invention, a stator coolant passage means including a damping member and a stator coolant tube is provided between a housing and a stator core to surround the outer periphery of the stator core. Therefore, the stator core is cooled by coolant flowing in the stator coolant tube so that the temperature rise of the damping member is suppressed. Accordingly, the damping member is restricted from deteriorating due to high temperature and maintains flexibility so that a stator is prevented from moving. Further, vibration of the stator is suppressed, and as a result, magnetic noise is decreased.

Moreover, an additional coolant tube is provided near other heat-generating bodies. In this case, the coolant flows in the stator coolant tube prior to the second coolant tube. Therefore, the coolant flowing in the stator coolant tube is not affected thermally by the coolant flowing in the additional coolant tube. Accordingly, the temperature rise of the damping member is effectively restricted.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF PREFERRED EMBODIMENTS

Preferred embodiments of the present invention will be described hereinafter with reference to drawings.

(First Embodiment)

Figure 1:
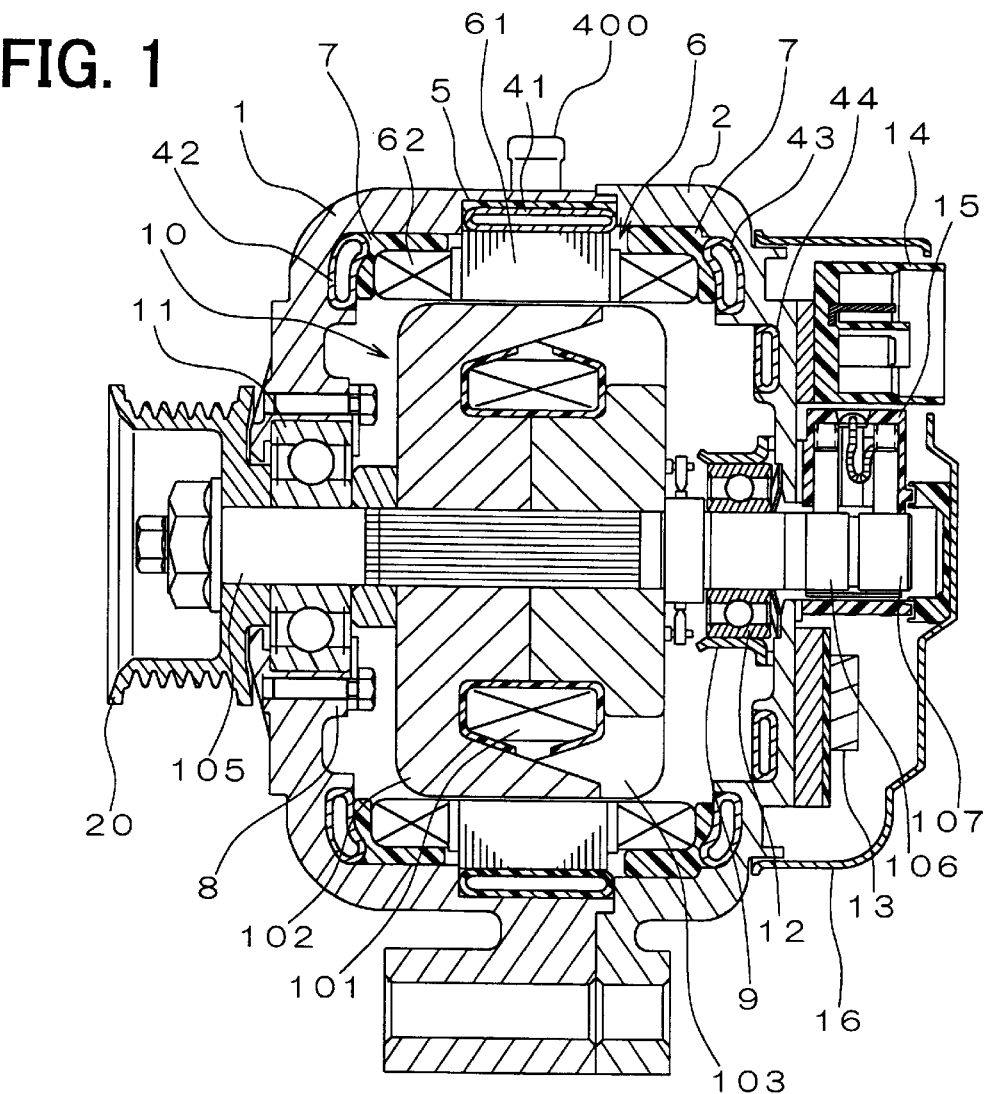
FIG. 1 is a schematic cross-sectional view of a rotary electric machine mounted on a vehicle according to a first embodiment of the present invention.

As shown in FIG. 1, a rotary electric machine mounted on a vehicle comprises a front housing 1, a rear housing 2, a damping member 5, a stator 6, a rotor 10, a commutating device 13, a voltage regulator 14, a brush device 15, and a rear cover 16.

The front housing 1 and the rear housing 2 are formed into a cup shape by aluminum die-casting, and fixed to each other by press-contacting openings thereof and by threading with a plurality of bolts (not shown).

Figure 2:
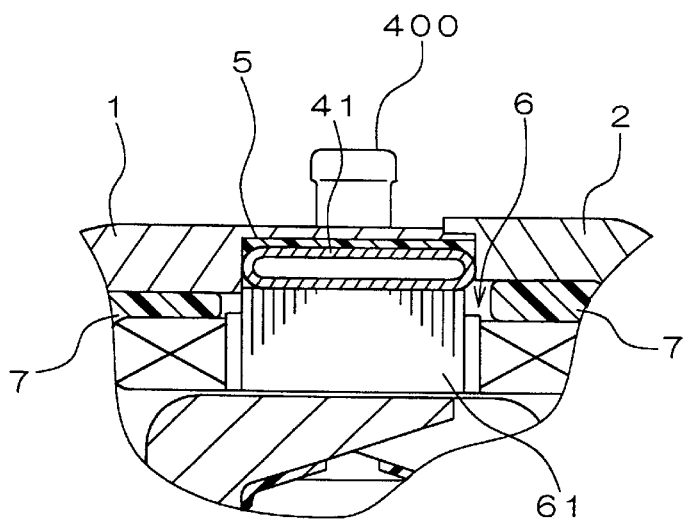
FIG. 2 is a partially enlarged cross-sectional view of the rotary electric machine according to the first embodiment.

The stator 6 is fixed at an inner peripheral side of the front housing 1. The damping member 5 and an annular flat coolant tube (stator coolant tube) 41 for defining a coolant passage are sandwiched between the stator core 6 and the front housing 1 as a stator coolant passage means. That is, the stator 6 is surrounded annularly by the damping member 5 through the stator coolant tube 41 inside the front housing 1. The damping member 5 is made of flexible resin and formed into a cylindrical shape. As shown in FIG. 2, the damping member 5 is installed between the inner peripheral surface of the front housing 1 and the outer peripheral surface of the stator coolant tube 41.

The stator 6 consists of a stator core 61 and an armature coil 62 provided in a plurality of slots formed in the stator core 61 to surround the stator core 61. The armature coil 62 protrudes from both axial end surfaces of the stator core 61 to form coil ends. A high thermal conductive resin 7 including filler is filled between one side of the coil ends of the armature coil 62 and the inner wall of the front housing 1 and between the other side coil end and the inner wall of the rear housing 2.

The rotor 10 consists of a field coil 101, pole cores (field cores) 102 and 103, and a rotary shaft 105. The rotor 10 is constructed by sandwiching the field coil 101 between the pole cores 102 and 103 and by press-fitting the rotary shaft 105 therein. A pair of slip rings 106 and 107 is provided near the rear side end of the rotary shaft 105 to electrically connect both ends of the field coil 101.

A cylindrically-shaped bearing box 8 is integrated to the front housing 1, and an iron-made bearing box 9 is fixed to the rear housing 2 with bolts (not shown). The bearing boxes 8 and 9 house bearings 11 and 12 to support the rotor 10 rotatably therein, respectively.

In addition to the stator coolant passage means having the stator coolant tube 41 around the stator core 61, a coolant tube 42 for defining the coolant passage is provided in the front housing 1 and coolant tubes 43 and 44 for defining the coolant passages are provided in the rear housing 2, as shown in FIG. 1. The coolant tube 42 is disposed in the inner axial end wall of the front housing 1 to face and contact the high thermal conductive resin 7 in the axial direction. The coolant tube 43 is disposed in the inner axial end wall of the rear housing 2 to face and contact the high thermal conductive resin 7 in the axial direction. Further, the coolant tube 44 is disposed in the inner wall of the rear housing 2 that is perpendicular to the rotary shaft 105.

Further, as shown in FIG. 1, electrical components, such as the commutating device 13, the voltage regulator 14 and the brush device 15 are attached to the axial outer surface of the rear housing 2 by bolts or the like. The commutating device 13 and the voltage regulator 14 are opposed to the coolant tube 44 through the rear housing 2 in the axial direction. The electrical components are covered with a steel-made rear cover 16.

In this rotary electric machine, when rotation force from an engine (not shown) is transmitted to a pulley through a belt and the like, the rotor 10 rotates in a predetermined direction. Then, when excitation voltage is applied to the field coil 101 of the rotor 10, each claw portion of the pole cores 102 and 103 is magnetized so that three-phase alternating current voltage is generated by the armature coil 62. A direct current power can be produced from an output terminal of the commutating device 13.

In this power generating state, the output current flows in the armature coil 62 and the commutating device 13, and the excitation current for the field coil 101 flows in the voltage regulator 14. Therefore, each of them generates heat. In the present embodiment, the above heat-generating bodies are cooled by coolant flowing in the coolant tubes 41, 42, 43 and 44. Here, an engine coolant is used as a coolant medium, for instance.

A coolant inlet 400 and a coolant outlet (not shown) are provided on the stator coolant tube 41. The engine coolant sucked from the coolant inlet 400 flows through the stator coolant tube 41 and is discharged from the coolant outlet. Since the stator coolant tube 41 is disposed between the damping member 5 and the stator core 61, the stator core 61 is effectively cooled by the coolant flowing in the stator coolant tube 41. Moreover, heat transmission from the stator core 61 to the damping member 5 is suppressed.

Similar to the stator coolant tube 41, the engine coolant flows in the coolant tubes 42 and 43 to sufficiently cool the front side and rear side coil ends of the armature coil 62 through the high thermal conductive resin 7, respectively. Further, the engine coolant flowing in the coolant tube 44 cools the commutating device 13 and the voltage regulator 14 through the rear housing 2.

According to the present embodiment, the damping member 5 is effectively cooled down by the coolant flowing in the stator coolant tube 41 that is disposed in the inner peripheral side of the damping member 5. Therefore, the damping member 5 is restricted from deteriorating and losing damping performance due to the temperature rise. Accordingly, the damping member 5 can maintain holding power to restrict the stator 6 from moving. In addition, since the damping member 5 maintains flexibility, vibration of the stator 6 is restricted so that magnetic noise is reduced.

In addition, since the coolant tubes 41, 42, 43 and 44 are separately arranged from each other, it is preferable to flow coolant separately in each of the coolant tubes. Therefore, it is restricted that the coolant flowing near the high temperature portion flows into the other coolant tubes that are disposed near the lower temperature portion. Specially, the coolant flows in the stator coolant tube prior to the other coolant tubes 42, 43 and 44. Thus, the coolant flows in the stator coolant tube 41 is not thermally affected by the coolant flowing in the other coolant tubes. Accordingly, each of the heat-generating bodies being in different temperatures is successfully cooled. Here, the coolant inlet 400 and the outlet (not shown) may be shared with the other coolant tubes 42, 43, 44 as far as the coolant can flow in the stator coolant tube 41 prior to the other coolant tubes. In this case, for example, a connecting tube (not shown) may be provided to connect the stator coolant tube with the other coolant tubes. On the contrary, the coolant inlet and outlet may be individually provided on each coolant tube.

(Second Embodiment)

Figure 3:
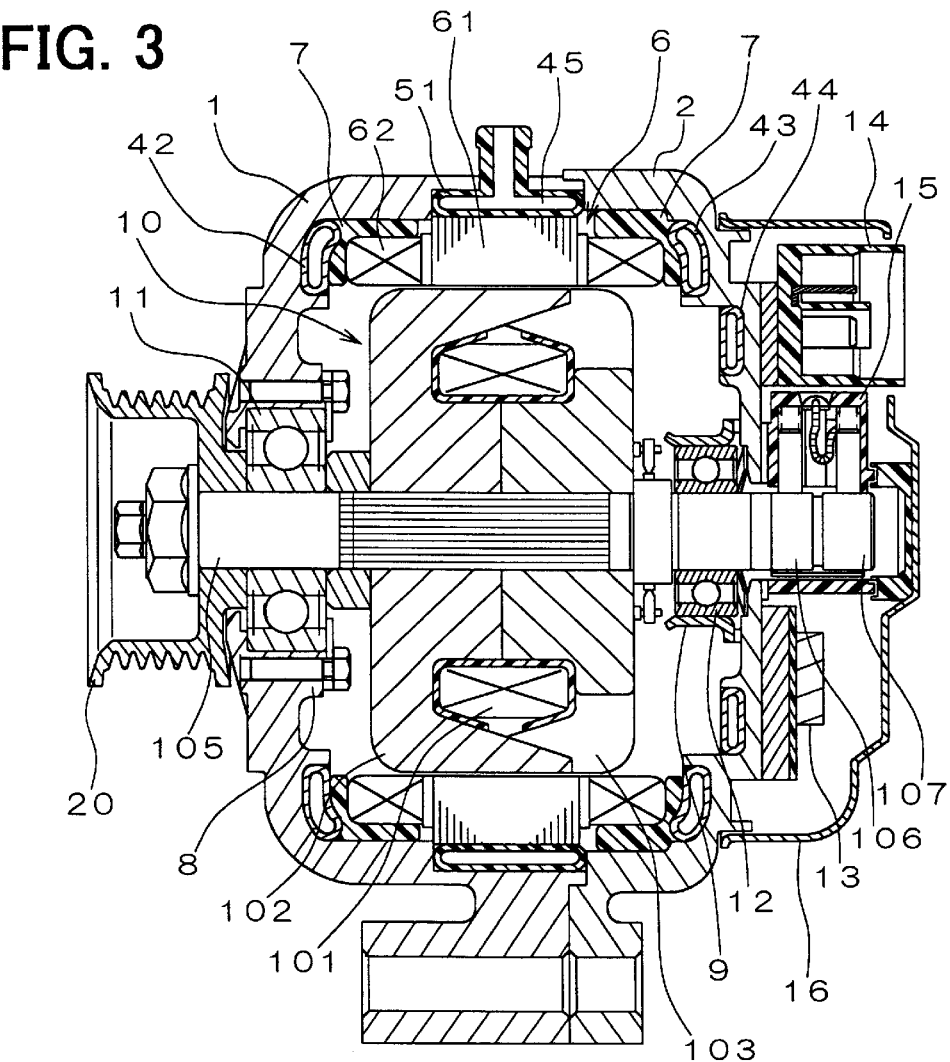
FIG. 3 is a schematic cross-sectional view of a rotary electric machine according to a second embodiment of the present invention.
Figure 4:
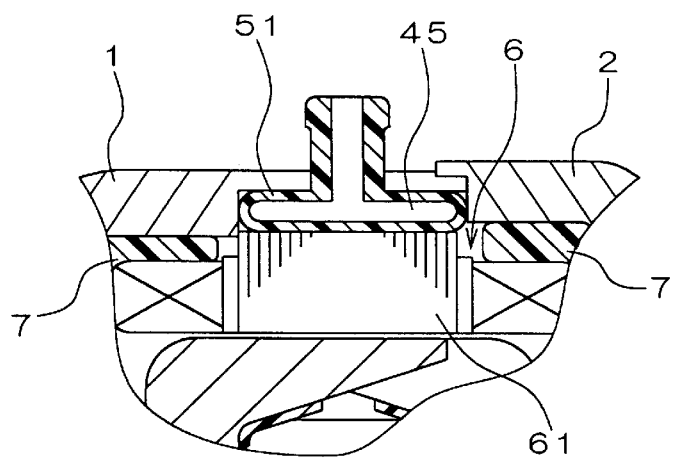
FIG. 4 is a partially enlarged cross-sectional view of the rotary electric machine according to the second embodiment.

In the second embodiment, as shown in FIGS. 3 and 4, a tubular damping member 51 may be used in place of the combination of damping member 5 and stator coolant tube 41 of the first embodiment. The damping member 51 has a hollow therein to define a coolant passage 45. That is, the damping member 51 functions as both a damper and a coolant tube as the stator coolant passage means.

The stator 6 is fixed to the axial inner peripheral surface of the front housing 1 sandwiching the damping member 51 defining the coolant passage 45 therein. The damping member 51 is in an annular-shape and has the hollow in the middle like a flat-tube, as shown in FIG. 4. The damping member 51 is made of the flexible resin and fixed between the front housing 1 and the stator 6. The damping member 51 is cooled directly from the inside by the coolant flowing in the coolant passage 45, so that the temperature of the damping member 51 is efficiently decreased.

(Third Embodiment)

Figure 5:
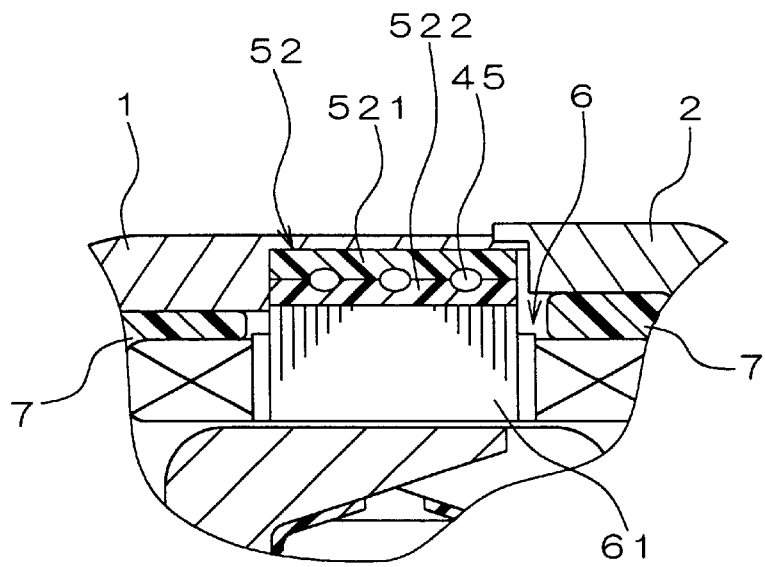
FIG. 5 is a partially enlarged cross-sectional view of the rotary electric machine according to a third embodiment of the present invention.

In the third embodiment, as shown in FIG. 5, a damping member 52 is used in place of the damping member 51 of the second embodiment. The damping member 52 is constructed by bonding a pair of plate-like damping member 521 and 522, and each of which has grooves for defining cooling passages 45. The damping member 52 is wound around the outer periphery of the stator core 61, and fixed to the inner peripheral surface of the front housing 1. Similar to the second embodiment, the damping member 52 is directly cooled by the coolant flowing inside of the damping member 52. Although the grooves are formed on both of the damping member 521 and 522 in FIG. 5, it may be preferable to form grooves only in one of the damping members 521 and 522 to form the cooling passages 45.

(Fourth Embodiment)

Figure 6:
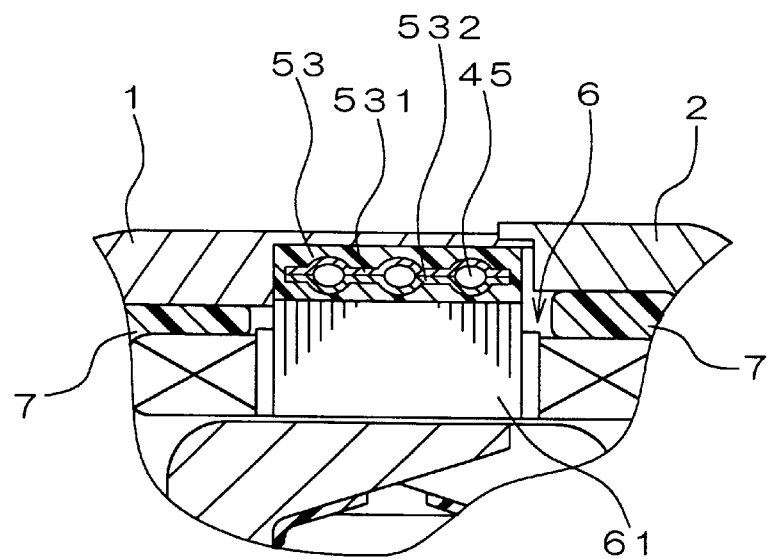
FIG. 6 is a partially enlarged cross-sectional view of the rotary electric machine according to a fourth embodiment of the present invention.

In the fourth embodiment, as shown in FIG. 6, the cooling passages 45 may be formed by inserting a pair of plate members 531 and 532 into the damping member 53. Each of or one of plate members 531 and 532 forms a groove on the surface to define the cooling passage 45 by being bonded with each other. In this case, the plate members 531 and 532 are made of a material harder than that of the damping member 53 so that the plate members 531 and 532 defining the cooling passages 45 are restricted from being deformed during installation of the stator 6. Therefore, the coolant can stably flow in the cooling passages 45.

The present invention should not be limited to the disclosed embodiments, but may be implemented in other ways without departing from the spirit of the invention.

What is claimed is:

1. A rotary electric machine mounted on a vehicle, comprising:
   a stator including a stator core and an armature coil that is wound around the stator core and has a coil end protruding from the stator core in an axial direction;

a rotor arranged opposite to the stator core;

a housing supporting the stator and the rotor; and a stator coolant passage means provided radially inside of the housing and radially outside of the stator core, the stator coolant passage means having a damping member and a stator coolant tube defining a stator coolant passage for flowing coolant therethrough, the damping member having a pan disposed radially outside the stator coolant passage, wherein the damping member is constructed of a pair of plate-like damping members, and at least one of the plate-like damping members has a groove on a surface thereof for defining the stator coolant passage.

2. The rotary electric machine as in claim 1, wherein the stator coolant passage means forms a flat tubular hollow within the damping member for defining the stator coolant passage.

3. The rotary electric machine as in claim 1, further comprising:

an additional coolant tube separately arranged from the stator coolant passage means, wherein the coolant flows in the stator coolant tube prior to the additional coolant tube.

4. The rotary electric machine as in claim 3, wherein a thermal conductive resin is provided between the coil end and the housing; and wherein the additional coolant tube is disposed to contact with the thermal conductive resin opposite to the coil end.

5. The rotary electric machine as in claim 3, further comprising:

a commutating device attached to an outer surface of the housing in the axial direction, wherein the additional coolant tube is disposed opposite to the commutating device through the housing in the axial direction.

6. The rotary electric machine as in claim 3, further comprising:

a voltage regulator attached to an outer surface of the housing in the axial direction, wherein the additional coolant tube is disposed opposite to the voltage regulator through the housing in the axial direction.

7. A rotary electric machine mounted on a vehicle, comprising:

a stator including a stator core and an armature coil that is wound around the stator core and has a coil end protruding from the stator core in an axial direction;

a rotor arranged opposite to the stator core;

a housing supporting the stator and the rotor; and a stator coolant passage means provided radially inside of the housing and radially outside of the stator core, the stator coolant passage means having a damping member and a stator coolant tube defining a stator coolant passage for flowing coolant therethrough, the damping member having a part disposed radially outside the stator coolant passage, wherein the damping member includes a pair of plates, at least one of plates has a groove on a surface thereof for defining the stator coolant passage by being bonded to each other.

8. A rotary electric machine mounted on a vehicle, comprising:

a stator including a stator core and an armature coil that is wound around the stator core and has a coil end protruding from the stator core in an axial direction;

a rotor arranged opposite to the stator core;

a housing supporting the stator and the rotor; and a stator coolant passage means provided radially inside of the housing and radially outside of the stator core, the stator coolant passage means having a damping member and a stator coolant tube defining a stator coolant passage for flowing coolant therethrough, the damping member having a part disposed radially outside the stator coolant passage, wherein the coolant tube and the damping member are separate, and wherein the coolant tube is sandwiched between the stator core and the damping member in a radial direction.

9. The rotary electric machine according to claim 8, wherein the damping member contacts an inner surface of the housing.

10. The rotary electric machine according to claim 1, wherein the coolant tube is adjacent to and in contact with the stator core in a radial direction.

11. The rotary electric machine according to claim 1, wherein the damping member and the coolant tube are formed integrally into a single unit that has vibration damping performance and allows the coolant to flow therethrough.

12. A rotary electric machine mounted on a vehicle, comprising:

a stator including a stator core and an armature coil that is wound around the stator core and has a coil end protruding from the stator core in an axial direction;

a rotor arranged opposite to the stator core;

a housing supporting the stator and the rotor; and a stator coolant passage means provided on an outer peripheral surface of the stator core, the stator coolant passage means having a damping member and a stator coolant tube defining a stator coolant passage for flowing coolant therethrough, wherein the damping member is constructed of a pair of plate-like damping members, and at least one of the plate-like damping members has a groove on a surface thereof for defining the stator coolant passage.

13. A rotary electric machine mounted on a vehicle, comprising:

a stator including a stator core and an armature coil that is wound around the stator core and has a coil end protruding from the stator core in an axial direction;

a rotor arranged opposite to the stator core;

a housing supporting the stator and the rotor; and a stator coolant passage means provided on an outer peripheral surface of the stator core, the stator coolant passage means having a damping member and a stator coolant tube defining a stator coolant passage for flowing coolant therethrough, wherein the damping member includes a pair of plates, at least one of the pairs of plates has a groove on a surface thereof for defining the stator coolant passage by being bonded to each other.

* * * * *